: US 6,556,526 B1
(45) Date of Patent: Apr. 29, 2003

(54) APPARATUS AND METHOD FOR ANALYZING THE READ-OUT SIGNAL OF AN OPTICAL STORAGE MEDIA

(75) Inventors: Shuh-Tai Lu, Taoyuan Hsien (TW); King Yin Wang, Kaohsiung Hsien (TW); Kuang-Yang Chuang, Kaohsiung (TW); Ching-Ping Kuei, Taoyuan Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 406 days.

(21) Appl. No.: 09/583,997

(22) Filed: May 30, 2000

(30) Foreign Application Priority Data

Mar. 1, 2000 (TW) ........................................ 89103587 A (51) Int. Cl.[7] ............................................... G11B 7/005
(52) U.S. Cl. ................................. 369/53.34; 369/59.17; 369/59.21
(58) Field of Search .......................... 369/53.31–53.36, 369/59.11, 59.13–59.21; 324/73.1; 386/124–126

(56) References Cited

U.S. PATENT DOCUMENTS 5,812,506 A * 9/1998 Pietrzykoski et al.

* cited by examiner

Primary Examiner—W. R. Young
(74) Attorney, Agent, or Firm—W. Wayne Liauh (57) ABSTRACT

The present invention relates to an apparatus and method for analyzing the read-out signal of an optical storage media and is especially suitable for the HF signal read from the digital video disk (DVD), wherein the HF signal comprises many different signals whose periods are integer times of the system period. The present apparatus can be used to record the maximum or minimum values of specific period of signals for further statistical analyses. Furthermore, the AC and DC components of the HF signal can be processed independently and the results will be combined together for further processes. Therefore, it only takes moderate memory capacity and acquisition time to obtain accurate maximum or minimum values of the specific period of signals.

34 Claims, 6 Drawing Sheets

APPARATUS AND METHOD FOR ANALYZING THE READ-OUT SIGNAL OF AN OPTICAL STORAGE MEDIA

BACKGROUND OF THE INVENTION

1. Field of Invention

The present invention relates to an apparatus and method for analyzing the read-out signal of an optical storage media and is especially suitable for the HF signal read from the digital video disk (DVD), wherein the HF signal comprises many different signals whose periods are integer times of the system period. The present apparatus and method can be used to record the maximum and minimum values of specific period of signals for further statistical analyses.

2. Related Art

The read-out signal of the DVD disk includes a series of different signals whose periods are integer times of the system period and is also called the HF signal. The period of the shortest signal is three times of the system period T, referred to the 3T-signal, while that of the longest signal is fourteen times of the system period, referred to the 14T-signal. The statistical analyses of the maximum and minimum values of specific period of signals have become important factors for verifying the disk quality.

One conventional way for obtaining the maximum and minimum values of a signal is to use a digital storage scope for recording the signal and then analyze the recorded signal by using some special programs. But because the method mentioned above needs a great number of memories to store all the information included in the signal regardless of its being useful or not, it is only suitable for low frequency signal with a short duration of time. Therefore, due to the limited memory capacity in a digital storage scope, it is impossible to obtain enough maximum and minimum values of the 3T-signal for further statistical analyses. Consequently, such a method is not suitable for analyzing the HF signal read from the DVD disks.

SUMMARY OF THE INVENTION

The present invention discloses an apparatus and method for analyzing the read-out signal of an optical storage media, by which the high frequency (HF) signal read from the optical storage media and the eight to fourteen modulation (EFM+) signal sliced from the HF signal can be processed to obtain the DC component signal via a low-pass filter. The HF signal and the DC component signal will then be fed to a differential amplifier to obtain the AC component signal of the HF signal. The present apparatus also includes a first switch unit for choosing whether the maximum value or the minimum value will be measured. Moreover, a 3T-signal detector unit and an nT-signal detector unit will be used to detect whether the positive edge, or the negative edge, of the current EFM+ signal occurs during the time interval of detection. A second switch unit is also included to choose between the 3T-signal detector unit and the nT-signal detector unit. Finally, the period of the current EFM+ signal will be identified and the HF signal may be recorded according to the identification result for further verifications.

BRIEF DESCRIPTION OF THE DRAWINGS

The present invention will become more fully understood from the detailed description given hereinbelow by illustration only, and thus is not limitative of the present invention, and wherein.

DETAILED DESCRIPTION OF THE INVENTION

In general, the read-out signal of an optical storage media, such as a DVD disk, includes a series of different signals whose periods are integer times of the system period and is also called the HF signal. The present invention proposes an apparatus and method for analyzing the modulation signal and the asymmetry signal in the HF signal. The apparatus is used to record the maximum and minimum values of specific period of signals from the HF signal so as to verify the quality of DVD disks. The HF signal and the EFM+ signal sliced from the HF signal used for the present invention can be easily obtained from the circuit of a commonly used DVD drive.

Figure 1A:
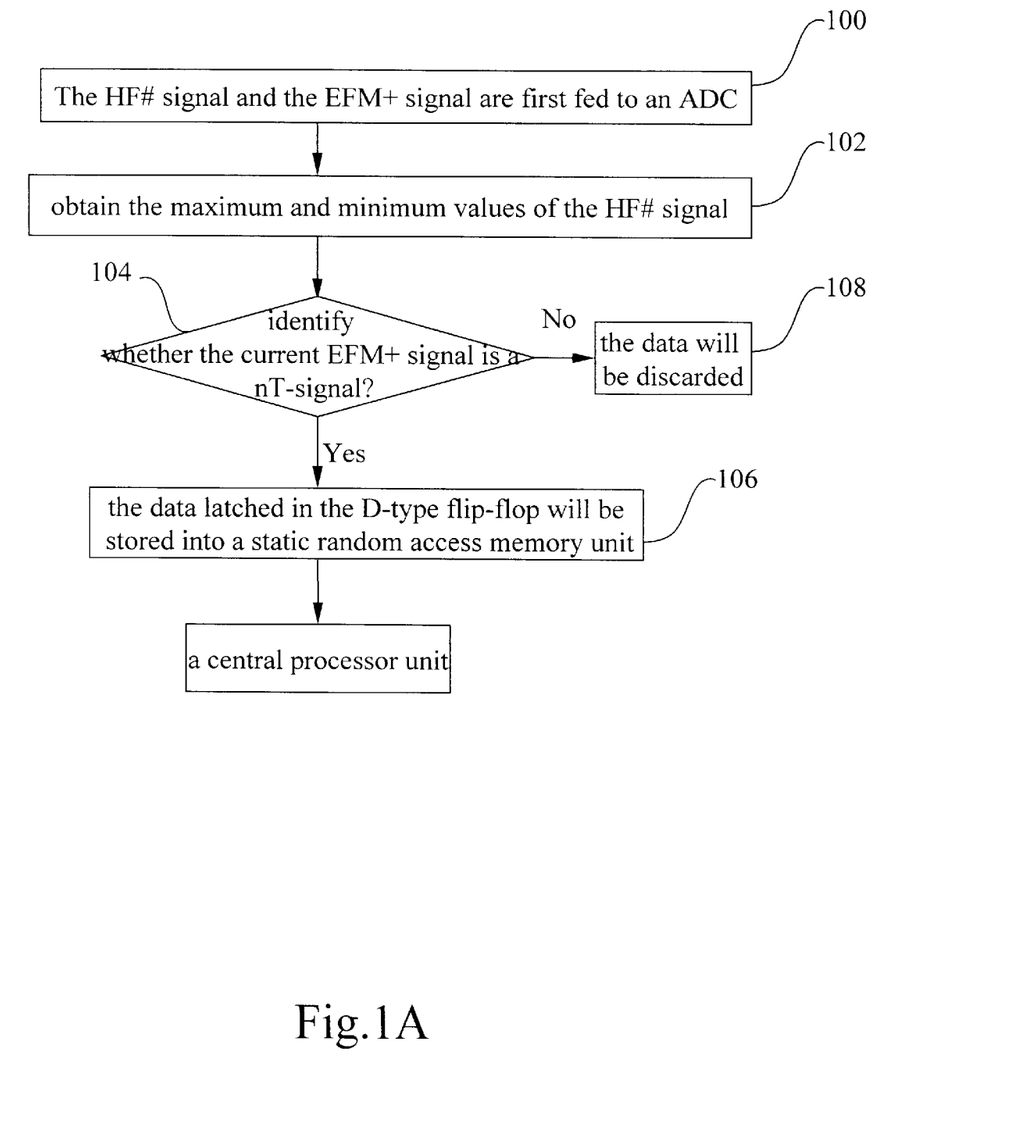
FIG. 1A discloses a timing flowchart of the method for analyzing the read-out signal of a DVD disk according to the present invention.

The timing flowchart of the method for analyzing the read-out signal of a DVD disk according to the present invention is shown in FIG. 1A. The HF# signal and the EFM+ signal are first fed to an analog to digital converter (ADC), as shown in step 100, to obtain the maximum and minimum values of the HF# signal, as shown in step 102, and to identify whether the current EFM+ signal is a nT-signal, as shown in step 104. Since the EFM+ signal is sliced from the HF# signal, it will lag the HF# signal for a short time. Therefore, when the identification of the current EFM+ signal is completed, it may be too: late to catch the maximum or minimum signal of the HF# signal on time. To overcome the problem mentioned above, we could catch the maximum or minimum signal of the HF# signal in advance and latch it in a D-type flip-flop. If the current EFM+ signal is ascertained to be a nT-signal, then the data latched in the D-type flip-flop will be stored into a static random access memory unit, as shown in step 106, and output to a central processor unit; if not, the data will be discarded, as shown in step 108.

Figure 1B:
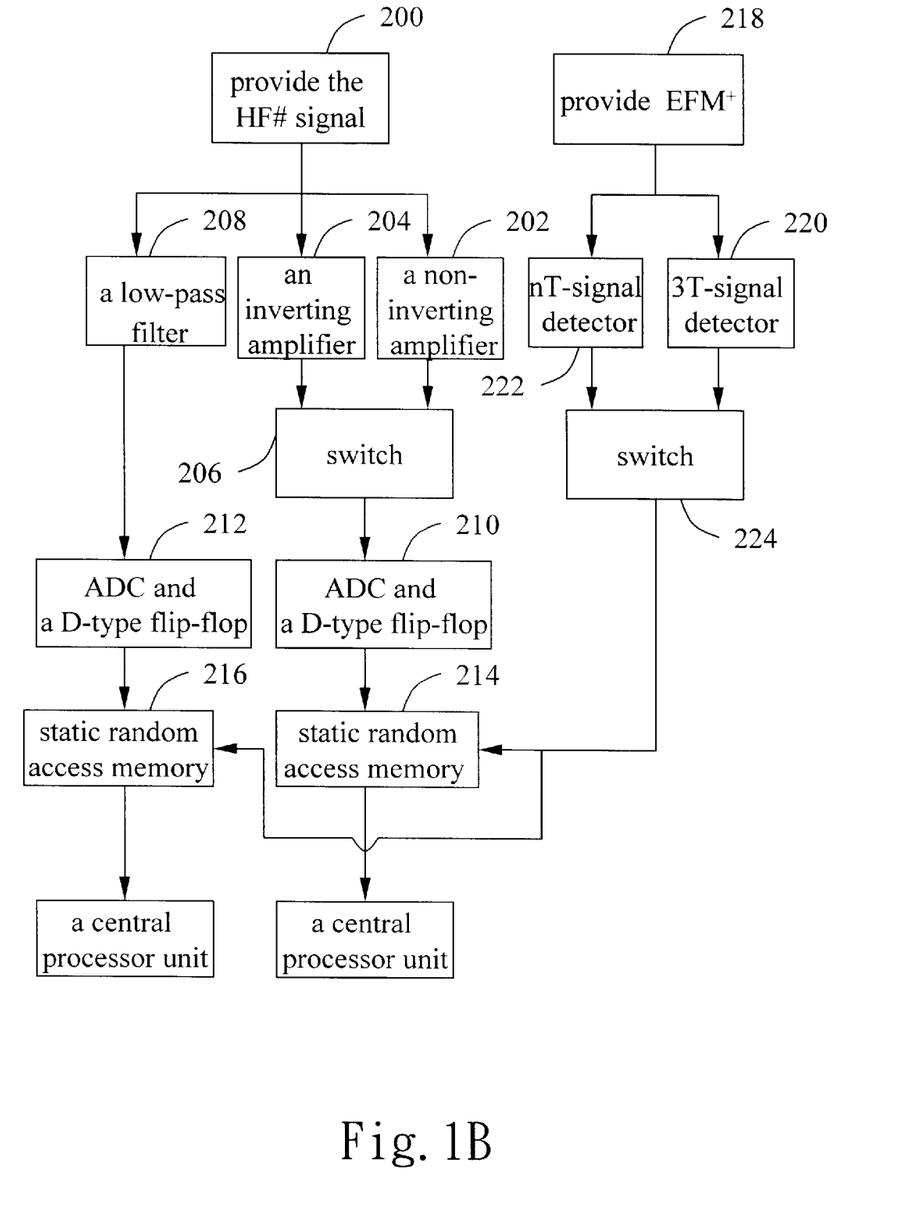
FIG. 1B discloses a signal flowchart of the method for analyzing the read-out signal of a DVD disk according to the present invention.

The signal flowchart of the method for analyzing the read-out signal of a DVD disk according to the present invention is shown in FIG. 1B. The first step is to provide the HF# signal, which comprises both the DC and AC component signals and is shown in step 200, to a non-inverting amplifier, as shown in step 202, and an inverting amplifier, as shown in step 204, simultaneously for signal amplification. And a switch is also provided to choose whether the maximum value or the minimum value will be measured. Moreover, The HF# signal is also fed to a low-pass filter for obtaining the DC component, as shown in step 208. The amplified signals and the DC component of the HF# signal will then be fed to an analog to digital converter. (ADC) and a D-type flip-flop respectively, as shown in steps 210 and 212. Finally, the processed data may be discarded or stored in a static random access memory unit, as shown in steps 214 and 216, and subsequently output to a central processor unit. Furthermore, the EFM+ signal, as shown in step 218, is also fed respectively to a 3T-signal detector, as shown in step 220, and a nT-signal detector, as shown in step 222, for identifying different period of signals. By using a switch, as shown in step 224, the user can choose which result of the above two detectors will be used to control whether the data latched in the D-type flip-flop will be stored into the static random access memory unit, as shown in steps 214 and 216.

Figure 2:
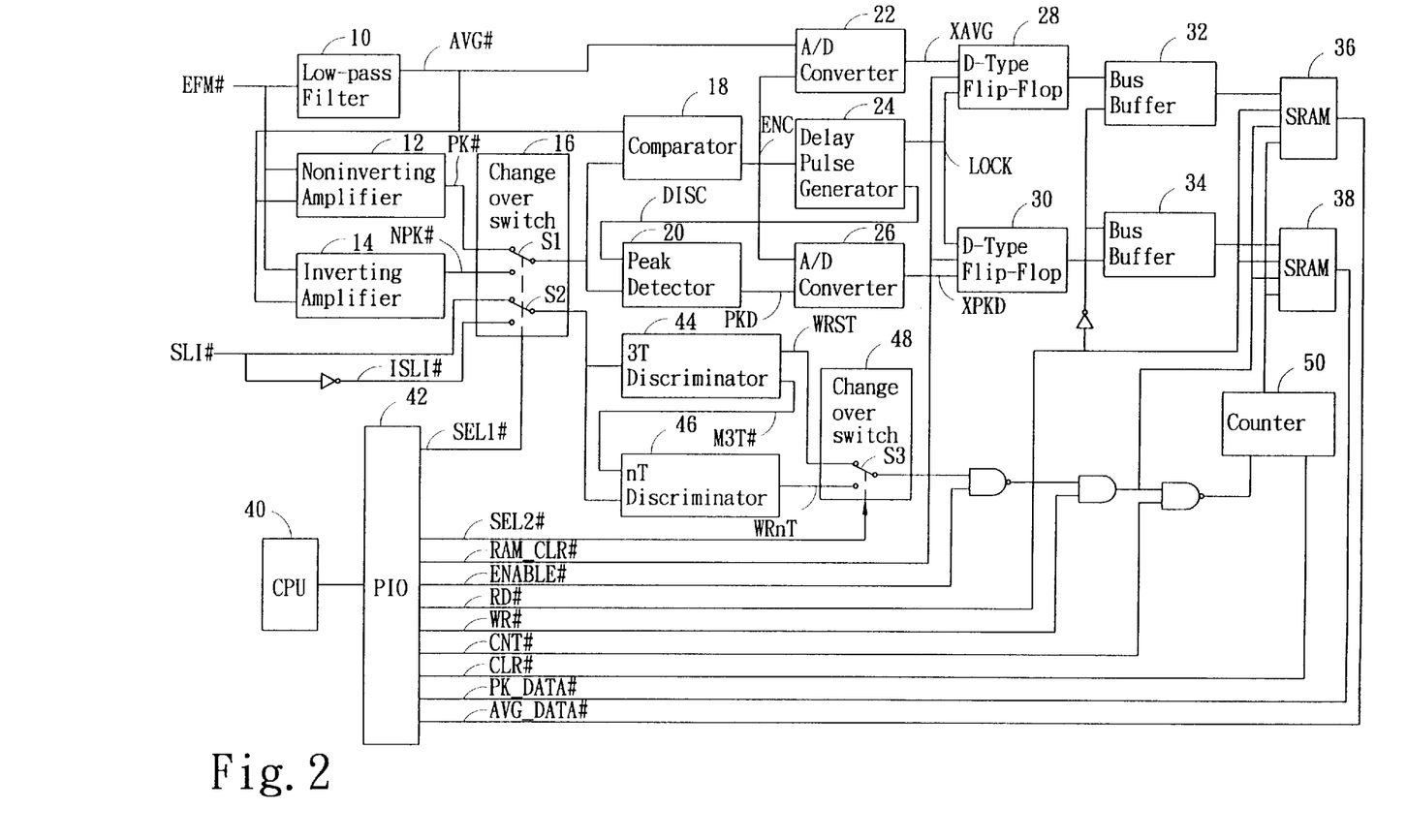
FIG. 2 discloses a block diagram of the apparatus for analyzing the read-out signal of a DVD disk according to the present invention.
Figure 3:
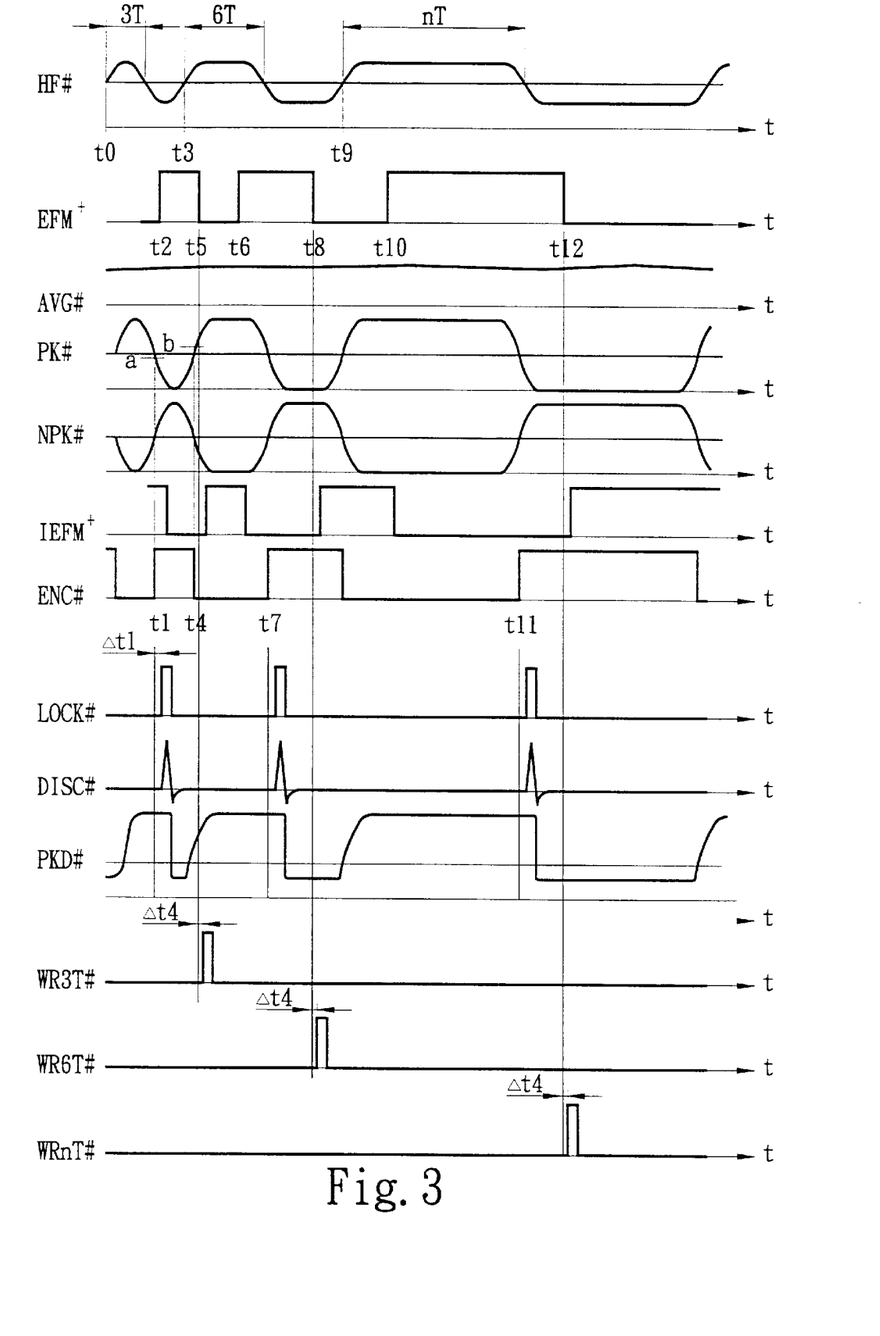
FIG. 3 discloses a timing diagram of the apparatus for analyzing the read-out signal of a DVD disk according to the present invention.

The block diagram of the apparatus for analyzing the read-out signal of a DVD disk according to the present invention is shown in FIG. 2, and the detailed description of each block will be given below in cooperation with the timing diagram as shown in FIG. 3.

First of all, the HF# signal is fed to a low-pass filter unit 10 to produce a DC component signal with a little amount of ripple, AVG#. The AVG# signal and the HF# signal are then fed to a non-inverting differential amplifier unit 12 for amplifying the AC component of the HF# signal while reserving the DC component so as to obtain the PK# signal. Subsequently, the PK# signal will go through a first switch unit 16 and be fed to a high-speed hysteresis comparator unit 18, such as AD8561, with the AVG# signal together. When the amplitude of the PK# signal is below the value of a or above the value of b, the comparator unit 18 will change its output state and thus produce the ENC# signal. The ENC# signal will then be used to trigger the analog to digital converter units 22 and 26 to sample and convert signals. The ENC# signal can also be fed to the delayed pulse generator unit 24 so as to produce the LOCK# signal and the discharging signal, DISC#. The LOCK# signal is used to trigger the D-type flip-flops 28 and 30 to latch the output of the analog to digital converter units 22 and 26. Because the DISC# signal can be used to discharge the capacitor in the peak detector unit 20, therefore, the DISC# signal and the PK# signal from the switch 16 will be fed to the peak detector unit 20 for producing the PKD# signal.

Subsequently, the AVG# signal and the ENC# signal are both fed to the high-speed analog to digital converter unit 22, such as AD9283BRS-100, so as to digitize the AVG# signal into the XAVG# signal in 10 ns after t1. Similarly, the PKD# signal and the ENC# signal are also be fed to the high-speed analog to digital converter unit 26 to digitize the PKD# signal into the XPKD# signal in 10 ns after t1. At $t1+\Delta t1$, the state of the LOCK# signal is positive edge and thus will trigger the D-type flip-flop unit 28 to latch the XAVG# signal and subsequently output to the buffer unit 32. Meanwhile, the D-type flip-flop unit 30 will also latch the XPKD# signal and subsequently output to the buffer unit 34. Therefore, with reference to FIG. 2, during two successive peaks of the HF# signal, both of the AVG# and PKD# signals will be digitized and latched in the D-type flip-flop units 28 and 30, respectively.

If the user wants to record the peak value of a specific signal in the HF# signal whose period is integer times of the system period, then the XAVG# and XPKD# signals, previously latched in the D-type flip-flop units 28 and 30 respectively, should be immediately stored into the static random access memory units 36 and 38 via the buffer units 32 and 34 respectively as soon as the specific period of signal is successfully identified. When the acquisition time is reached, all the peak values stored in the static random access memory units 36 and 38 can be fetched by the central processor unit 40 via the parallel input/output interface unit 42 for further statistical analyses.

If the gain of the non-inverting amplifier unit 12 is A, then the relation between the HF# and the PK# signals can be described as follows.

$$PK=A*(HF-AVG)+AVG$$

Since the value obtained from the peak detector unit 20 is the peak value of the PK# signal, not that of the HF# signal, therefore the actual peak value of the HF# signal, PEAK#, can be easily expressed in terms of the AC component signal, XPKD# - XAVG#, and the DC component signal, XAVG, as follows.

$$PEAK=K*((XPKD-XAVG)/A+XAVG), \text{ wherein K is a constant coefficient.}$$

In general, the DVD drive can be used to slice the HF# signal so as to obtain the EFM+ signal by way of shaping the HF# signal as a series of rectangular waveforms. Therefore, the EFM+ signal will lag the HF# signal for t2-t0.

The EFM+ signal can be fed to the 3T-signal detector unit 44 via the switch unit 16, wherein the 3T-signal detector unit 44 can be used to identify whether the current EFM+ signal is a 3T-signal or not. If the current EFM+ is ascertained to be a 3T-signal; then the 3T-signal detector will produce a write signal, WR3T#, after $\Delta t4$ of delay when the negative edge of the 3T-signal occurs. The WR3T# signal can then be used to trigger the static random access memory units 36 and 38 to store the values of XAVG# and XPKD# signals, which are previously latched in the D-type flip-flop units 28 and 29, via the buffer units 32 and 34, respectively.

Figure 4:
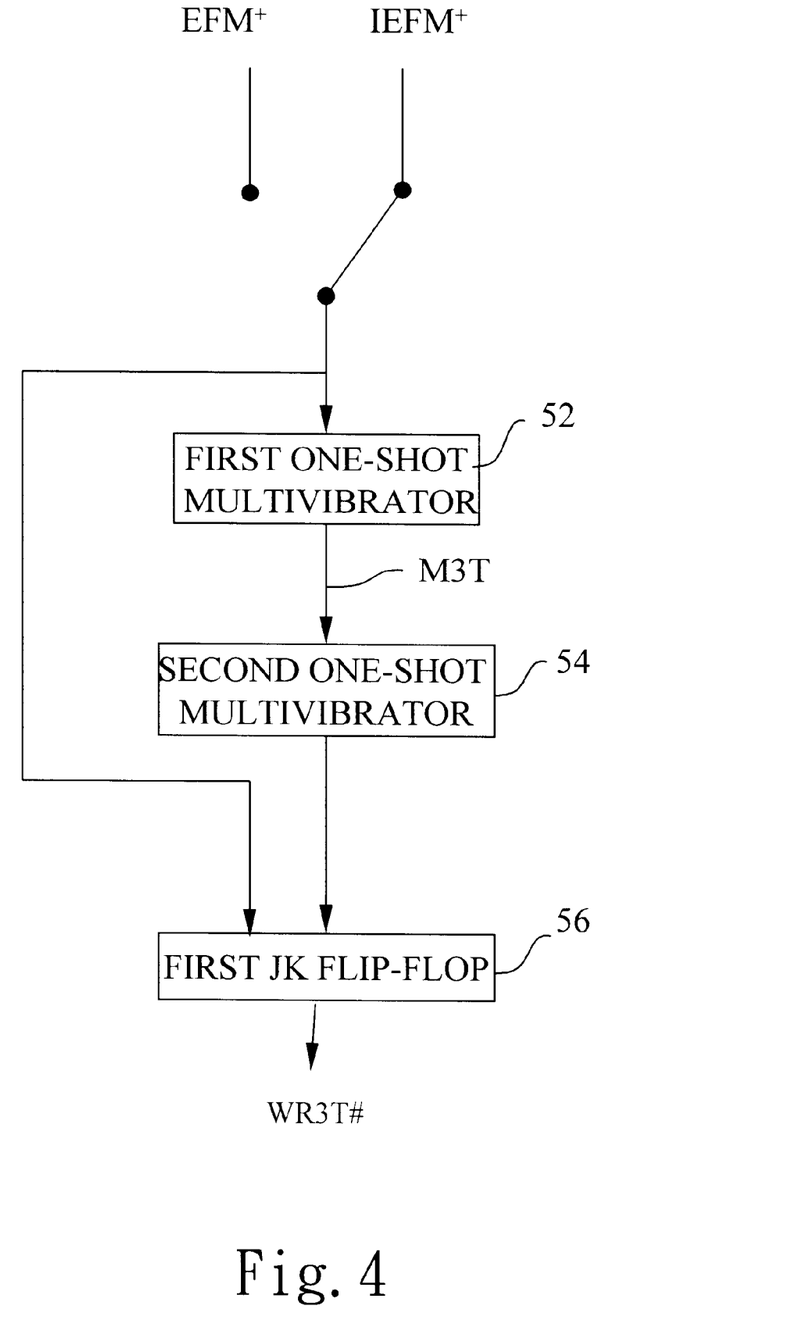
FIG. 4 shows a circuit schematic of the 3T-signal detector unit according to the present invention.

FIG. 4 shows the circuit schematic of the 3T-signal detector unit 44. At t2, the positive edge of the EFM+ signal will trigger the first one-shot multivibrator 52 to produce a pulse signal, M3T, with time period of 2.5T. Subsequently, the M3T signal will trigger the second one-shot multivibrator 54 to produce a pulse signal with time period of 1T, which will be fed to the first JK flip-flop 56. At t5, the negative edge of the EFM+ signal will also trigger the first JK flip-flop 56 and produce at $t5+\Delta 4$ a pulse signal, WR3T#. The time delay of $\Delta t4$ is due to the internal delay of the first JK flip-flop circuit 56.

If the user wants to record the XAVG# and XPKD# signals of the HF# signal with nT periods of time, then the EFM+ signal should be fed to the nT-signal detector 46 via the switch unit 16. The nT-signal detector unit 46 can be used to identify whether the current EFM+ signal is a nT-signal or not. If the current EFM+ is ascertained to be a nT-signal, the nT-signal detector will produce a write signal, WRnT#, after $\Delta t4$ of delay when the negative edge of the vT-signal occurs. By switching the second switch unit 48 to an appropriate position, the WRnT# signal can then be used to trigger the static random access memory units 36 and 38 to store the values of XAVG# and XPKD# signals, which are previously latched in the D-type flip-flop units 28 and.30, via the buffer units 32 and, 34, respectively. The waveform of the WRnT# signal output from the nT-signal detector unit 46 when n=6 is shown in FIG. 3.

Figure 5:
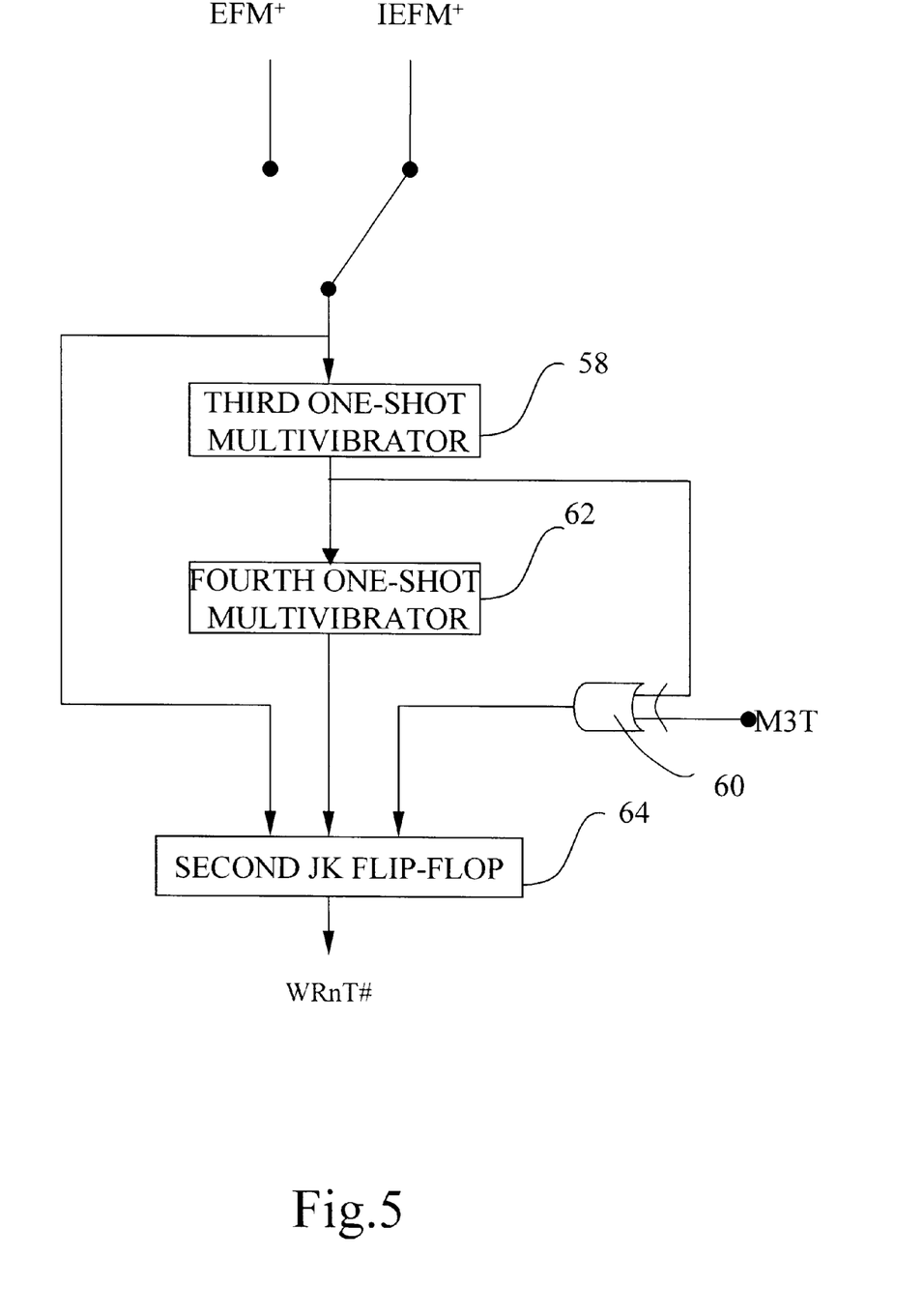
FIG. 5 shows a circuit schematic of the nT-signal detector unit according to the present invention.

FIG. 5 shows the circuit schematic of the nT-signal detector unit 46. At tx, the positive edge of the EFM+ signal will trigger the three one-shot multivibrator 58 in the 3T-signal detector unit 46 to produce a pulse signal, M3T, with time period of 2.5T. The M3T signal will then be fed to the XOR gate 60. Meanwhile, the positive edge of the EFM+ signal will also trigger the fourth one-shot multivibrator 62 to produce a pulse signal with time period of (n−0.5)T to the XOR gate 60, wherein the value of n can be adjusted by VR1 and later another pulse signal with time period of 1T is produced to be fed to the 2J input terminal of the second JK flip-flop 64. If the negative edge of the EFM+ signal triggers the second JK flip-flop 64 at ty and ty-tx<(n−0.5T), then the second JK flip-flop 64 will send a clear signal, CLR# which is not shown on the drawing, to the third one-shot multivibrator 58 and the fourth one-shot multivibrator 62 so that the WRnT# will not be produced. The WRnT# signal will be produced only if ty-tx=nT.

As shown in FIG. 3, the positive edge of the EFM+ signal triggers the third one-shot multivibrator 58 and the fourth one-shot multivibrator 62 at t2 and clears them at t5. Similarly, the positive edge of the EFM+ signal triggers the third one-shot multivibrator 58 and the fourth one-shot multivibrator 62 again at t6 and also clears them at t8. But when the positive edge of the EFM+ signal triggers the third one-shot multivibrator 58 and the fourth one-shot multivibrator 62 at t10, the WRNT# signal will be produced at t12+Δt4 because t12−t10=nT.

One more embodiment of the present invention is to record the minimum value of a specific signal in the HF# signal whose period is integer times of the system period. The method for obtaining the minimum value of the HF# signal is similar to the previous method. That is, both of the AVG# and HF# signals are fed to the inverting differential amplifier unit 14 for amplifying the AC component of the HF# signal while reserving the DC component so as to obtain the NPK# signal. The IEFM+ signal can also be obtained by feeding the EFM+ signal to an inverter. With reference to FIG. 3, only by switching the states of S1 and S2 in the switch 16, all the processes for obtaining the minimum value of the HF# signal are the same as that for obtaining the maximum value. But the equation for calculating the minimum value of the HF# signal, VPEAK#, should be modified as follows.

$$VPEAK = K * (XAVG - (XPKD - XAVG)/A)$$

Wherein K is a constant coefficient and the gain of the inverting amplifier unit 14 is supposed to be the same as that of the non-inverting amplifier unit 12.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for analyzing the read-out signal of an optical storage media, which comprises the steps of:
   providing a high frequency (HF) signal, which is read from the optical storage media and also comprises:
      a DC component signal, which is obtained by using a low-pass filter unit; and
      an AC component signal, which is obtained by feeding both of the HF signal and the DC component signal to a differential amplifier;
   providing an eight to fourteen modulation (EFM+) signal, which is sliced from the HF signal;
   providing a first switch unit which is used to choose whether the maximum value or the minimum value of the HF signal will be measured;
   using a 3T-signal detector and a nT-signal detector to detect whether the positive edge, or negative edge, of the EFM+ signal occurs in the time interval of detection;
   providing a second switch unit, which is used to choose between the 3T-signal detector unit and the nT-signal detector unit; and
   identifying the period of the EFM+ signal and recording the HF signal.

2. The method for analyzing the read-out signal of an optical storage media of claim 1 wherein the EFM+ signal can be obtained from a DVD drive.

3. The method for analyzing the read-out signal of an optical storage media of claim 1 wherein the amplifier includes a non-inverting amplifier unit for amplifying the upper waveform of the HF signal.

4. The method for analyzing the read-out signal of an optical storage media of claim 3 wherein the actual value of each point on the upper waveform before amplification is the sum of the corresponding AC component and DC component signals with appropriate coefficients.

5. The method for analyzing the read-out signal of an optical storage media of claim 1 wherein the amplifier includes an inverting amplifier unit for amplifying the lower waveform of the HF signal.

6. The method for analyzing the read-out signal of an optical storage media of claim 5 wherein the actual value of each point on the lower waveform before amplification is the subtraction between the corresponding DC component and AC component signals with appropriate coefficients.

7. The method for-analyzing the read-out signal of an optical storage media of claim 1 also comprising two memory units for recording the DC component signal and the AC component signal.

8. The method for analyzing the read-out signal of an optical storage media of claim 7 wherein the access address of the memory is produced by a counter.

9. The method for analyzing the read-out signal of an optical storage media of claim 1 wherein the time interval is from nT−0.5ΔT to nT+0.5ΔT, while n is N and ΔT is the time period of detection.

10. The method for analyzing the read-out signal of an optical storage media of claim 1 wherein the signal detector includes a first one-shot multivibrator and a second one-shot multivibrator.

11. The method for analyzing the read-out signal of an optical storage media of claim 10 wherein the first one-shot multivibrator is triggered by the positive edge, or the negative edge, of the EFM+ signal.

12. The method for analyzing the read-out signal of an optical storage media of claim 11 wherein the time duration of the first one-shot multivibrator after triggering is nT−0.5ΔT, while ΔT is the time period of detection.

13. The method for analyzing the read-out signal of an optical storage media of claim 10 wherein the second one-shot multivibrator is triggered by the output of the first one-shot multivibrator.

14. The method for analyzing the read-out signals of an optical storage media of claim 13 wherein the time duration of the second one-shot multivibrator after triggering is ΔT, and ΔT is the time period of detection.

15. The method for analyzing the read-out signal of an optical storage media of claim 1 wherein if the period of the signal to be identified is greater than 3T, the method also comprises the steps as follows:
   clearing the first one-shot multivibrator and the second multivibrator if the negative edge of the EFM+ signal occurs in the time interval between 3T−0.5ΔT and nT−0.5ΔT, wherein n is N and ΔT is the time period of detection.

16. The method for analyzing the read-out signal of an optical storage media of claim 1 wherein the first switch unit is used to choose whether the upper waveform or the lower waveform of the HF signal will be fed to a comparator unit and a peak detector unit.

17. The method for analyzing the read-out signal of an optical storage media of claim 16 wherein the output of the comparator unit is fed to the peak detector unit via a delayed pulse generator unit.

18. The method for analyzing the read-out signal of an optical storage media of claim 1 wherein the maximum value or the minimum value of the HF signal is latched by using two D-type flip-flops respectively.

19. An apparatus for analyzing the read-out signal of an optical storage media, comprising:
- a low-pass filter unit, which is used to produce the DC component signal of the read-out signal;
- a non-inverting amplifier unit, which is used to produce the maximum value of the read-out signal;
- an inverting amplifier unit, which is used to produce the minimum value of the read-out signal;
- a first switch unit, which is used to choose whether the maximum value or the minimum value of the high frequency (HF) signal will be measured;
- a comparator unit, which is used to produce a first output signal according to the DC component signal and an upper waveform, or a lower waveform;
- a peak detector unit, which is used to produce a second output signal according to the upper waveform, or the lower waveform, and a discharge signal;
- a 3T-signal detector unit and an nT-signal detector unit, which is used to detect whether the positive edge, or the negative edge, or the EFM+ signal sliced from the read-out signal occurs in the time interval of detection;
- a second switch unit, which is used to choose between the 3T-signal detector unit and the nT-signal detector; and
- two memory units, which are used to record the DC component signal and an AC component signal respectively for verifying the read-out signal.

20. The apparatus for analyzing the read-out signal of an optical storage media of claim 19 wherein the read-out signal is a high frequency (HF) signal read from the optical storage media.

21. The apparatus for analyzing the read-out signal of an optical storage media of claim 19 wherein the EFM+ signal is sliced from the HF signal.

22. The apparatus for analyzing the read-out signal of an optical storage media of claim 19 wherein the EFM+ signal can be obtained from a DVD drive.

23. The apparatus for analyzing the read-out signal of an optical storage media of claim 19 wherein the actual value of.each point on the upper waveform before amplification is the sum of the corresponding AC component and DC component-signals with appropriate coefficients.

24. The apparatus for analyzing the read-out signal of an optical storage media of claim 19 wherein the actual value of each point on the lower waveform before amplification is the subtraction between the corresponding DC component and AC component signals with appropriate coefficients.

25. The apparatus for analyzing the read-out signal of an optical storage media of claim 19 wherein the access address of the memory is produced by a counter.

26. The apparatus for analyzing the read-out signal of an optical storage media of claim 19 wherein the time interval is from $nT-0.5\Delta T$ to $nT+0.5\Delta T$, n is N and $\Delta T$ is the time period of detection.

27. The apparatus for analyzing the read-out signal of an optical storage media of claim 19 wherein the signal detector includes a first one-shot multivibrator and a second one-shot multiyibrator.

28. The apparatus for analyzing the read-out signal of an optical storage media of claim 27 wherein the first one-shot multivibrator is triggered by the positive edge, or the negative edge, of the EFM+ signal.

29. The apparatus for analyzing the read-out signal of an optical storage media of claim 28 wherein the time duration of the first one-shot multivibrator after triggering is $nT-0.5\Delta T$, while $\Delta T$ is the time period of detection.

30. The apparatus for analyzing the read-out signal of an optical storage media of claim 27 wherein the second one-shot imultivibrator is triggered by the output of the first one-shot multivibrator.

31. The apparatus for analyzing the read-out signal of an optical storage media of claim 30 wherein the time duration of the second one-shot multivibrator after triggering is $\Delta T$, while $\Delta T$ is the time period of detection.

32. The apparatus for analyzing the read-out signal of an optical storage media of claim 19 wherein, if the period of the signal to be identified is greater than 3T, the method also comprises the steps of:
- clearing the first one-shot multivibrator and the second multivibrator if the negative edge of the EFM+ signal occurs in the time interval between $3T-0.5\Delta T$ and $nT-0.5\Delta T$, while n is N and $\Delta T$ is the time period of detection.

33. The apparatus for analyzing the read-out signal of an optical storage media of claim 19 wherein the apparatus also includes a delayed pulse generator for connecting the comparator unit to the peak detector unit.

34. The apparatus for analyzing the read-out signal of an optical storage media of claim 19 wherein the maximum value or the minimum value of the HF signal is latched by using two D-type flip-flops respectively.

* * * * *